United States Patent [19]

Haugrud

[11] Patent Number: 4,482,167
[45] Date of Patent: Nov. 13, 1984

[54] RETRACTABLE HITCH

[76] Inventor: Harvey L. Haugrud, Rte. 2, Box 16, Lake Park, Minn. 56554

[21] Appl. No.: 483,671

[22] Filed: Apr. 11, 1983

[51] Int. Cl.³ .............................................. B60D 1/06
[52] U.S. Cl. .............................. 280/491 B; 280/415 A
[58] Field of Search ............ 280/491 B, 491 R, 491 S, 280/488, 490 R, 498, 499, 495, 415 A, 433

[56] References Cited

U.S. PATENT DOCUMENTS

| | | | |
|---|---|---|---|
| 2,531,859 | 11/1950 | Mock | 280/491 B |
| 2,823,930 | 2/1958 | Cooper | 280/491 B |
| 2,830,829 | 4/1958 | Gensinger et al. | 280/491 R |
| 2,849,243 | 7/1960 | Matthews | 280/491 B |
| 2,944,836 | 7/1960 | Matthews | 280/491 B |
| 3,718,347 | 2/1973 | Mann | 280/491 B X |
| 4,109,930 | 8/1978 | Pilhall | 280/491 B |
| 4,256,324 | 3/1981 | Hamilton | 280/491 B X |

FOREIGN PATENT DOCUMENTS 2352679 12/1977 France .

*Primary Examiner*—David M. Mitchell
*Assistant Examiner*—Mitchell J. Hill
*Attorney, Agent, or Firm*—Merchant, Gould, Smith, Edell, Welter & Schmidt

[57] ABSTRACT

A hitch for attachment beneath the bumper of a powered vehicle is disclosed. The tow bar of the hitch is held in a retracted position by a pivotal wall locked in place, or the tow bar is clamped in an operational position by the same pivotal wall locked in place. The retractable hitch is completely functional by moving a handle beneath the hitch and rotating the tow bar as appropriate.

6 Claims, 5 Drawing Figures

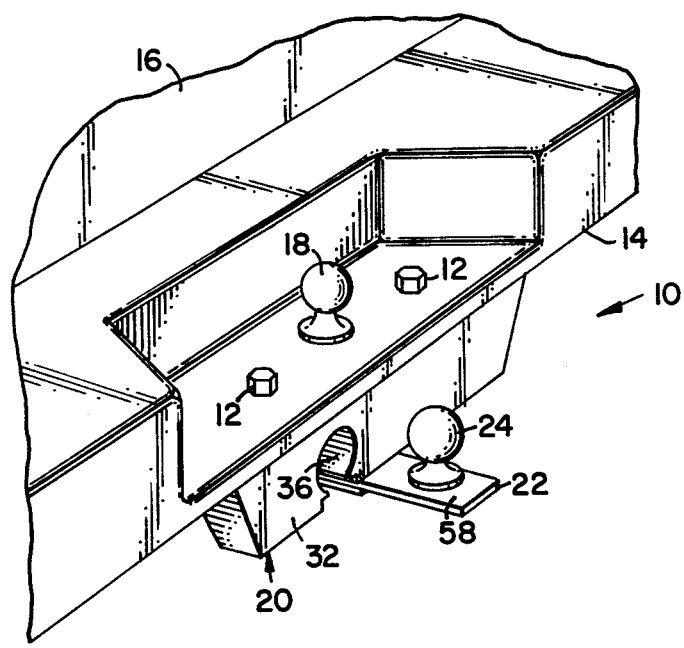
FIG. 1
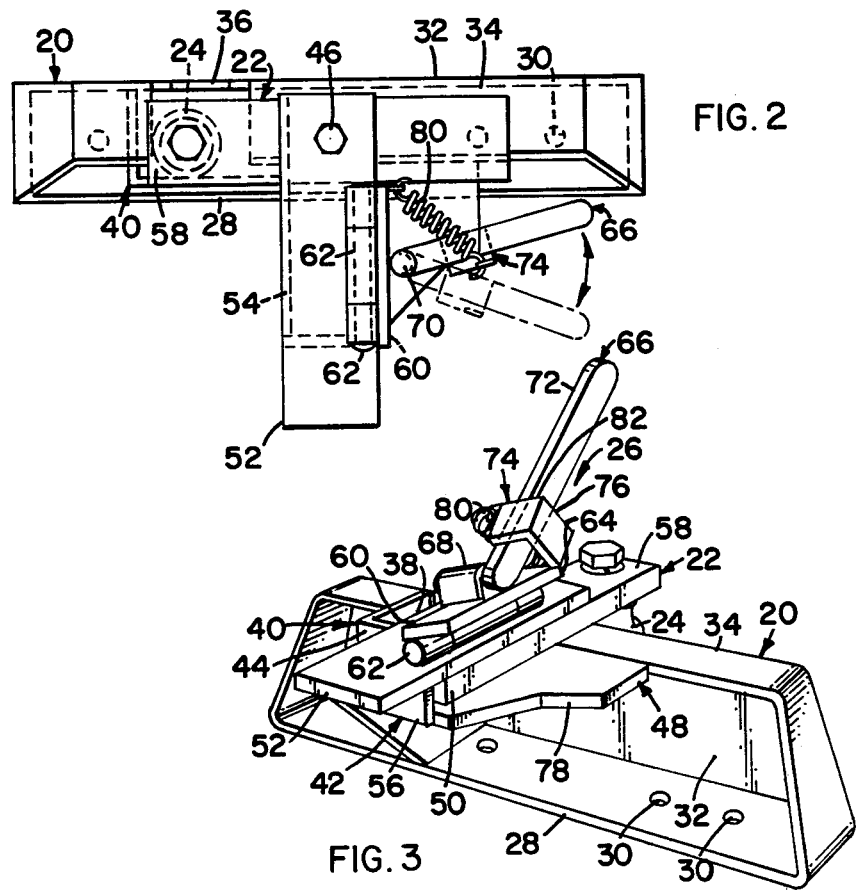
FIG. 2
FIG. 3

RETRACTABLE HITCH

TECHNICAL FIELD

This invention relates to the field of hitches, particularly retractable hitches, which allow a powered vehicle to pull an unpowered, wheeled structure.

BACKGROUND OF THE INVENTION

Hitches of various types are well known. Retractable hitches are also known. For example, U.S. Pat. Nos. 2,531,859, 2,823,930, 2,849,243 and 2,944,836 all show various mechanisms for moving the ball portion of a hitch from an operational position to a retracted position. In a couple of cases, the locking mechanism for the two positions is an inconvenient bolt or pin with a nut or wing nut. In a couple of the cases, the hitch swings about an horizontal axis so that the vehicle must be a specified elevation above the ground surface to allow the hitch to swing. In one of the cases, the tow bar is simply rested on a bar thereby allowing it to rattle.

The present hitch art shows fastening mechanisms beneath the vehicle with a two bar extending rearedly and upwardly to support a ball behind the vehicle and at an elevated location. Such hitches are commonly usable on an automobile for the purpose of towing a trailer. The situation exists wherein a pickup truck or other vehicle having an elevated rear bumper is commonly used for towing. Oftentimes, a ball or other hitch mechanism is attached above the bumper. Many towed vehicles, however, are not readily attached to such a high ball or hitch mechanism. The art does not show a hitch mechanism which may be retracted and stored beneath the bumper and which may be extended for low elevation operational use to pull a towed vehicle having a low hitch. The indicated problem is most often solved by forcing a low tow bar to grasp the highly elevated ball. Such a solution raises a question regarding safety. The art, however, does not provide a better solution.

SUMMARY OF THE INVENTION

The present invention is directed to a hitch for attachment beneath a structure such as a vehicle bumper. The hitch includes a frame and a tow bar pivotally attached to the frame. There are first and second mechanisms attached to the frame for stopping pivotal movement of the tow bar in first and second directions. A locking mechanism clamps or holds the tow bar against one of the first and second stopping mechanisms. The locking mechanism includes a handle which is rotatable about first and second orthogonal axes. In this fashion, the tow bar is rotatable between first and second positions just by operating the locking mechanism with the indicated handle.

The present hitch advantageously provides a low hitch mechanism such as a ball beneath an elevated bumper so that a trailer requiring a low hitch may be safely towed. Furthermore, the hitch is easily moved between operational and retracted positions. The retracted position provides a neat compact package beneath the vehicle bumper.

The hitch has a unique lock-in and lock-out mechanism which may be conveniently operated from behind the vehicle and which protects enclosures into which portions of the pivotable tow bar and ball of the hitch move.

These advantages and the objects obtained with this invention may be better understood by reference to the drawings and the accompanying descriptive matter hereinafter which illustrate and describe a preferred embodiment of the invention.

BRIEF DESCRIPTION OF THE DRAWINGS

FIG. 1 is a perspective view of the reaward end of a hitch in accordance with the present invention as attached to the bumper of a vehicle;

FIG. 2 is a bottom view of the hitch with the two bar in the retracted position;

FIG. 3 is a perspective view showing the bottom and forward end of the hitch with the locking mechanism unlocked and the tow bar in the operational position;

DETAILED DESCRIPTION OF THE PREFERRED EMBODIMENT

Figure 4:
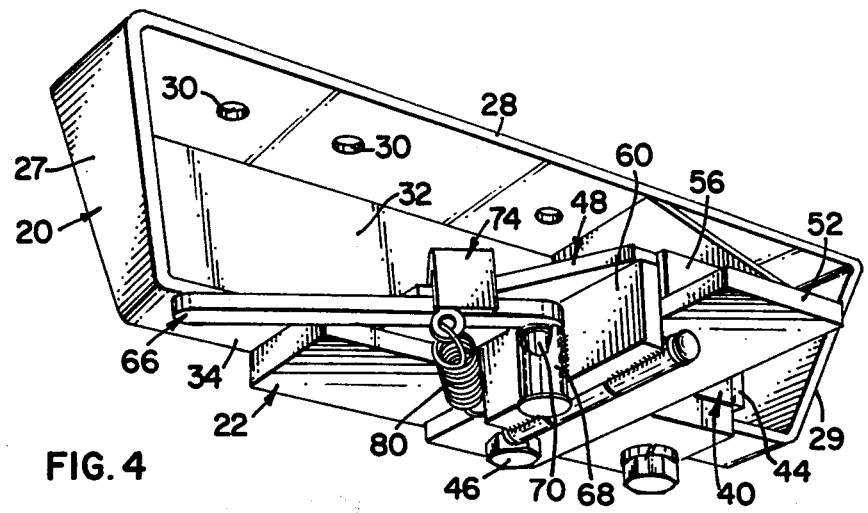
FIG. 4 is a perspective view from the bottom showing the tow bar locked in the retracted position.
Figure 5:
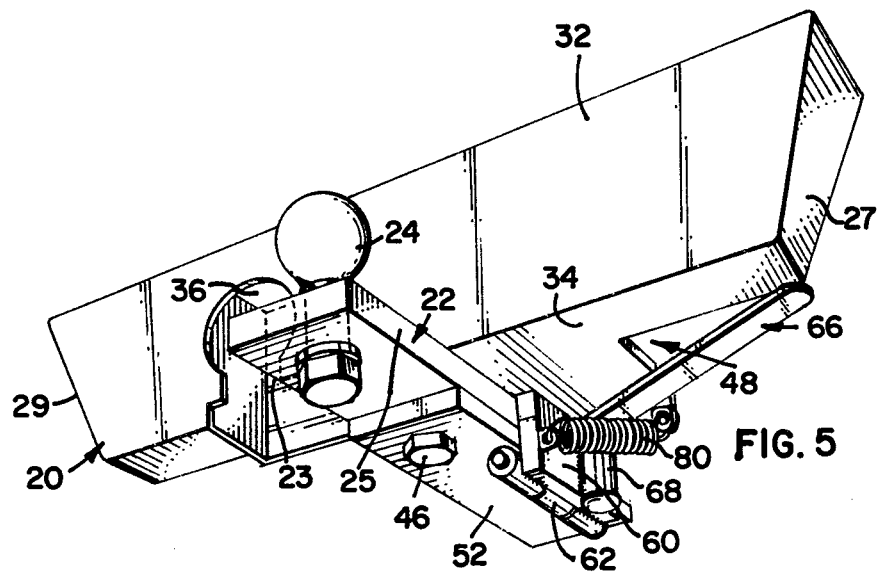
FIG. 5 is a perspective view from the bottom showing the tow bar locked in the operational position.

Referring now to the drawings wherein like reference numerals designate identical or corresponding parts throughout the several views, and more particularly to FIG. 1, a hitch in accordance with the present invention is designated generally as 10. Hitch 10 is attached with a pair of nut and bolt fasteners 12 beneath a bumper 14 of a powered vehicle 16. Typically, a ball 18 or other hitching mechanism is attached above bumper 14.

Hitch 10 is shown in detail from its underside in FIGS. 2 and 3. Hitch 10 includes a frame 20 to which a tow bar 22 with an attached ball 24 is pivotally attached. Tow bar 22 is rotatable between an operational position as shown in FIG. 3 and a retracted position as shown in FIG. 2. Locking mechanism 26 functions to hold tow bar 22 at one or both of opposite side edges 23, 25 in one of its two final positions.

Frame 20 could be constructed in a variety of different designs. As shown frame 20 is an irregular box with an open front side. Each of the opposite sides 27, 29 of the box slope inwardly toward the longitudinal centerline of the vehicle 16. Top side 28 conforms to the underside of bumper 14 and has openings 30 therethrough for passage of bolts 12. Backside 32 and underside 34 have slots 36 and 38 respectively for passage therethrough of ball 24.

Frame 20 includes first and second partial enclosures 40 and 42. Partial enclosure 40 is a box within the box structure of frame 20. Partial enclosure 40 has sufficient size to receive ball 24. The forwardmost wall 44 of partial enclosure 40 (also referred to as first wall 44 of frame 20) is located so that when tow bar 22 is in the retracted position, the side of ball 24 contacts wall 44. Slots 36 and 38 are located to allow ball 24 to move into partial enclosure 40 as tow bar 22 rotates about nut and bolt combination 46, the center of which forms the pivotal axis for tow bar 22. Bolt 46 is approximately centered from side to side and front to back on bottom side 34. In that way, ball 24 and tow bar 22 are approximately centered when hitch 10 is centered on bumper 14.

Partial enclosure 42 extends beneath and forwardly of bottom side 34. Upper wall 48 is either an integral part of underside 34 or is welded or otherwise attached to an edge thereof. Upper wall 48 is in sliding contact with tow bar 22. Upper wall 48 forms the upper side of partial enclosure 42 about end portion 50 of tow bar 22 when tow bar 22 is in its operational position oriented substantially parallel with the centerline of vehicle 16. Lower wall 52 is parallel with upper wall 48 but spaced apart from it in order to receive tow bar 22 therebetween. Sidewall 54 (also referred to as second wall 44 of frame 20) and forward wall 56 extend between walls 48 and 52. Sidewall 54 is a first stop for tow bar 22 and is located so as to stop the pivotal rotation of tow bar 22 when it is aligned with the vehicle centerline. Sidewall 54 extends rearwardly sufficiently far to abut or nearly abut tow bar 22 when it is in its retracted position with ball 24 in contact with forward wall 44 of partial enclosure 40.

As implied hereinbefore, tow bar 22 is a rectangular bar with ball 24 attached at an end 58. The other end 50 provides a side edge for clamping or locking as described hereinafter.

A pivotal wall 60 (also referred to as third wall 60 of frame 20) is fastened with hinge 62 to lower wall 52 of partial enclosure 42. Pivotal wall 60 is attached to swing into a position abutting edges of walls 52 and 56 and the bottom side of wall 48. Pivotal wall 60 forms a side opposite wall 54 of partial enclosure 42. Pivotal wall 60 functions to clamp tow bar 22 within partial enclosure 42 to hold tow bar 22 in its operational position. Pivotal wall 60 also functions as a second stop to hold tow bar 22 in its retracted position by abutting its rearmost edge 64 against a side edge of tow bar 22 to retain an edge of ball 24 against rear wall 44 of partial enclosure 40.

Pivotal wall 60 is held in place by locking mechanism 26. Locking mechanism 26 includes handle 66 which is pivotally held by bracket 68 to the outer side of pivotal wall 60. Handle 66 is L-shaped having one leg 70 held by bracket 68 along an axis perpendicular to the axis of hinge 62 thereby allowing handle 66 to rotate about first and second orthogonal axes. The other leg 72 of handle 66 has attached thereto an angle member 74. Angle member 74 is located near the end of leg 72 which intersects with leg 70 and itself has a leg 76 spaced apart from leg 72 of handle 66 approximately the width of upper wall 48. Leg 76 of angle member 74 points generally rearwardly. Wall 48 (also referred to as a fourth wall 48 of frame 20) includes a portion 78 which extends outwardly from partial enclosure 42 so that when pivotal wall 60 is swung into its clamping or holding position, handle 66 may be rotated so portion 78 of wall 48 is engaged between leg 76 and leg 72 thereby locking pivotal wall 60 in position. A biasing spring 80 is attached between the other leg 82 of angle member 74 and the rearmost end of pivotal wall 60 in order to bias locking mechanism 26 in a direction of engagement with portion 78 of wall 48.

In use, hitch 10 is either the primary hitching mechanism for a vehicle or a secondary mechanism. For example, a ball 18 may be installed on the top of a bumper 14 for usual use. However, when pulling trailers or other towed vehicles having low tow bars, a low hitch, providable by apparatus 10 may be used. Advantageously, hitch 10 has a retractable ball, and a frame which may be on unobtrusively attached beneath bumper 14.

Hitch 10 is attached to bumper 14 with bolts 12 at openings 30 of upper wall 28. Assuming tow bar 22 and ball 24 are in the retracted position, they are easily rotated into the operational position. Handle 66 is pushed forwardly to disengage locking mechanism 26 from portion 78 of wall 48. Handle 66 is then moved downwardly to rotate pivotal wall 60 away from clamping or holding contact with tow bar 22. Tow bar 22 is then rotated by grasping ball 24 and moving it rearwardly. Tow bar 22 is clamped in the operational position by moving handle 66 upwardly to rotate pivotal wall 60 into contact with a side edge of tow bar 22. Handle 66 is then rotated rearwardly so that locking mechanism 26 engages portion 78. Bias spring 80 prevents inadvertent disengagement. Tow bar 22 in its operational position is clamped at one end between pivotal wall 60 and opposite fixed wall 54 of partial enclosure 42.

To return tow bar 22 to the retracted position, handle 66 is again rotated forwardly to disengage locking mechanism 26 from portion 78 and downwardly to move rotatable wall 60 away from clamping engagement against tow bar 22. Tow bar 22 is rotated about bolt 46 until ball 24 contacts back wall 44 of partial enclosure 40. Handle 66 is then moved upwardly to rotate pivotal wall 60 so that rearmost edge 64 holds a side edge of tow bar 22 to prevent rotation of tow bar 22 which would move ball 24 out of contact with wall 44. Handle 66 is moved rearwardly allowing mechanism 26 to engage portion 78 thereby retaining the holding position of pivotal wall 60. In this position, it is advantageous that pivotable wall 60 combines with a side edge of tow bar 22 to completely enclose partial enclosure 42 thereby preventing dirt, mud or other debris from filling partial enclosure 42 and making further operational use of hitch 10 difficult.

Thus, numerous characteristics and advantages of hitch 10 have been set forth in the foregoing description, together with details of structure and function. It is to be understood, however, that the description is illustrative only. Consequently, any changes made, especially in matters of shape, size and arrangement, to the full extent extended by the general meaning of the terms in which the appended claims are expressed, are within the principal of the invention.

What is claimed is:

1. A hitch, comprising:
   a frame;
   a tow bar pivotally attached to said frame;
   first means, attached to said frame, for stopping pivotal movement in a first direction of said tow bar;
   second means, attached to said frame, for stopping pivotal movement in a second direction of said tow bar; and
   means for locking said tow bar against one of said first and second stopping means, said locking means including a handle, said handle being rotatable about first and second orthogonal axes to one of lock and unlock said locking means;
   said frame including first and second partial enclosures, said first stopping means including a ball attached near an end of said tow bar and a first wall forming one side of said first partial enclosure, said ball moving into said first partial enclosure and contacting said first wall to stop pivotal movement of said tow bar in the first direction, said second stopping means including a second wall forming one side of said second partial enclosure, said tow bar moving into said second partial enclosure and contacting said second wall to stop pivotal movement of said tow bar in the second direction;
   whereby said tow bar is rotatable between first and second positions on operation of said locking means with said handle.

2. A hitch in accordance with claim 1 wherein said locking means includes means for covering said second partial enclosure when said ball is in contact with said first wall of said first partial enclosure, said covering means preventing debris from filling said second partial enclosure and hindering operation of said hitch.

3. A hitch in accordance with claim 2 wherein said covering means includes a pivotal third wall and an edge of said tow bar, said third wall being pivotal to allow rotation of a second end of said tow bar into and out of said second partial enclosure.

4. A hitch, comprising:
- a frame including first and second walls;
- a tow bar having opposite side edges, said tow bar being pivotally attached to said frame for movement between operational and retracted positions;
- a ball attached to said tow bar;
- a third wall povitally attached to said frame; and
- means for locking said third wall to prevent said tow bar from pivoting, said tow bar in the operational position being clamped at said opposite side edges between said second frame wall and said pivotable third wall, respectively, said tow bar in the retracted position being held at said ball and one of said side edges by said first frame wall and said pivotable third wall, respectively;
- whereby said locking means locks with said pivotable third wall to hold said tow bar in one of said operational and retracted positions.

5. A hitch in accordance with claim 4 wherein said locking means includes a handle pivotally attached to said pivotable third wall and an angle member attached to said handle, and wherein said frame includes a fourth wall extending parallel to said tow bar, said angle member having one leg spaced from said handle to allow said fourth wall to fit between said handle and said one leg of said angle member thereby locking said pivotal third wall which thereby holds said tow bar in operational and retracted positions.

6. A hitch in accordance with claim 5 wherein said locking means includes means for biasing said handle and said angle member about the pivotal axis of said handle toward a holding position of said fourth wall.

* * * * *